United States Patent
Krishnamurthy et al.

(10) Patent No.: US 8,619,716 B2
(45) Date of Patent: *Dec. 31, 2013

(54) IQ IMBALANCE IMAGE COMPENSATION IN MULTI-CARRIER WIRELESS COMMUNICATION SYSTEMS

(75) Inventors: Sandeep H. Krishnamurthy, Arlington Heights, IL (US); Colin D. Frank, Park Ridge, IL (US)

(73) Assignee: Motorola Mobility LLC, Libertyville, IL (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/031,383

(22) Filed: Feb. 21, 2011

(65) Prior Publication Data
US 2012/0213095 A1 Aug. 23, 2012

(51) Int. Cl.
*H04W 4/00* (2009.01)
(52) U.S. Cl.
USPC ........... 370/332; 370/252; 370/343; 375/260; 375/295; 375/296; 455/63.3; 455/296; 455/501
(58) Field of Classification Search
USPC ................ 370/252, 254, 329, 332, 338, 343; 455/423, 434, 501, 509, 522; 450/63.1, 450/63.2, 63.3, 114.2, 296; 375/260, 295, 375/296, 346, 350
See application file for complete search history.

(56) References Cited

U.S. PATENT DOCUMENTS

| | | | |
|---|---|---|---|
| 7,020,226 B1 | 3/2006 | Kirkland | |
| 7,158,503 B1 | 1/2007 | Kalliojarvi et al. | |
| 7,167,513 B2 | 1/2007 | Tsui et al. | |
| 7,466,768 B2 | 12/2008 | Su et al. | |
| 7,599,664 B2 | 10/2009 | Sebire et al. | |
| 7,652,976 B2 | 1/2010 | Wen et al. | |
| 7,653,164 B2 | 1/2010 | Lin et al. | |
| 7,742,539 B2 | 6/2010 | Fonden et al. | |
| 7,822,399 B2 | 10/2010 | Wallen et al. | |
| 7,831,220 B2 | 11/2010 | Hammerschmidt et al. | |
| 7,856,065 B2 | 12/2010 | Jonsson | |
| 8,050,343 B2 | 11/2011 | Nordstrom et al. | |
| 2003/0185286 A1 | 10/2003 | Yuen | |
| 2005/0047536 A1 | 3/2005 | Wu et al. | |
| 2006/0128339 A1 | 6/2006 | Petrovic | |
| 2007/0263667 A1* | 11/2007 | Dubuc et al. | 370/500 |
| 2008/0279221 A1 | 11/2008 | Wen et al. | |
| 2010/0120442 A1 | 5/2010 | Zhuang et al. | |

(Continued)

FOREIGN PATENT DOCUMENTS

WO 2010104365 A2 9/2010

OTHER PUBLICATIONS

United States Patent and Trademark Office, Non-Final Office Action for U.S. Appl. No. 13/031,397 dated Aug. 14, 2012, 10 pages.

(Continued)

*Primary Examiner* — Awet Haile

(57) ABSTRACT

A method in a wireless communication terminal includes receiving an aggregated carrier including a first component carrier and a second component carrier, determining a level of interference from a signal received on the first component carrier to a signal on the second component carrier based on a signal characteristic of the first component carrier and a signal characteristic of the second component carrier, and providing signal interference information to a serving base station if the determined interference level satisfies a condition.

11 Claims, 4 Drawing Sheets

(56) References Cited

U.S. PATENT DOCUMENTS

| | | | |
|---|---|---|---|
| 2010/0166049 A1 | 7/2010 | Ahirwar et al. | |
| 2010/0232395 A1 | 9/2010 | McLeod et al. | |
| 2011/0021154 A1 | 1/2011 | Marinier et al. | |
| 2011/0026476 A1 | 2/2011 | Lee et al. | |
| 2011/0032908 A1* | 2/2011 | Lindoff et al. | 370/332 |
| 2011/0081936 A1 | 4/2011 | Haim et al. | |
| 2011/0103333 A1 | 5/2011 | Berggren et al. | |
| 2011/0212693 A1 | 9/2011 | Sagfors et al. | |
| 2011/0255484 A1 | 10/2011 | Zhang et al. | |
| 2011/0267955 A1 | 11/2011 | Dalsgaard | |
| 2011/0310753 A1* | 12/2011 | Chou et al. | 370/252 |
| 2011/0310830 A1 | 12/2011 | Wu et al. | |
| 2011/0312328 A1* | 12/2011 | Choi et al. | 455/450 |
| 2012/0008563 A1 | 1/2012 | Johansson et al. | |
| 2012/0057449 A1 | 3/2012 | Takaoka et al. | |
| 2012/0113935 A1 | 5/2012 | Lindoff et al. | |
| 2012/0122472 A1 | 5/2012 | Krishnamurthy et al. | |
| 2012/0275330 A1 | 11/2012 | Sipila et al. | |
| 2012/0287875 A1 | 11/2012 | Kim et al. | |
| 2012/0314675 A1* | 12/2012 | Vujcic | 370/329 |
| 2013/0036147 A1 | 2/2013 | Yan | |

OTHER PUBLICATIONS

Narasimha et al., "Signal Measurement on Component Carriers in Wireless Communication Systems" U.S. Appl. No. 13/031,297, filed Feb. 21, 2011.

Narasimha et al., "Signal Measurement on Component Carriers in Wireless Communication Systems" U.S. Appl. No. 13/031,401, filed Feb. 21, 2011.

Patent Cooperation Treaty, "PCT Invitation to Pay Additional Fees and, where Applicable, Protest Fee" for International Application No. PCT/US2012/024652 May 3, 2012, 9 pages.

3GPP TSG RAN WG4 #54, R4-103000 Simulations for Measurements of Deactivated Carriers, Huawei, Madrid, Spain, Aug. 23-27, 2010, 18 pages.

3GPP TSG RAN WG4 #44, R4-071338 "Simulation Results on RSRP with Higher Layer Time Domain Filtering" Samsung, Athens, Greece, Aug. 20-24, 2007, 4 pages.

3GPP TSG RAN WG4 #57AH, R4-110330 "Additional RRM Requirements for Carrier Aggregation" Renesas Electronics Europe, Nokia, Austin, USA, Jan. 17-21, 2011, 6 pages.

3GPP TSG RAN WG4 #43, R4-070742 "Considerations on LTE Measurement Bandwidth, Measurement Period and Reporting Period" Motorola, Kobe, Japan, May 7-11, 2007, 4 pages.

3GPP TSG RAN WG2 #73, R2-11xxxx, "Measurement of Deactivated Scells" Motorola Mobility, Taipei, Taiwan, Feb. 21-25, 2011, 3 pages.

Patent Cooperation Treaty, "PCT Search Report and Written Opinion of the International Searching Authority" for International Application No. PCT/US2012/024626 May 7, 2012, 11 pages.

Patent Cooperation Treaty, "PCT Search Report and Written Opinion of the International Searching Authority" for International Application No. PCT/US2012/024612 May 7, 2012, 12 pages.

Patent Cooperation Treaty, "PCT Search Report and Written Opinion of the International Searching Authority" for International Application No. PCT/US2012/024615 Jun. 18, 2012, 14 pages.

3GPP TSG RAN WG2 #71bis, R2-105340 "Discussion on Measurement Requirement on SCC" ZTE, Xi'an, China, Oct. 11-15, 2010, 2 pages.

3GPP TSG RAN WG4 Ad Hoc #4, R4-103553 "Analysis on Carrier Aggregation (CA) Measurements of SCell" ZTE, Xi'an, China, Oct. 11-15, 2010, 2 pages.

3GPP TSG RAN WG2 #69, Tdoc R2-101197 "Measurement Events for Carrier Aggregation" Ericsson, ST-Ericsson, San Francisco, USA, Feb. 22-26, 2010, 8 pages.

3GPP TSG RAN WG4 #55, R4-102041 "Initial Simulations for Mobility in Carrier Aggregation" Nokia, Nokia Siemens Networks, Montreal, Canada, May 10-14, 2010, 10 pages.

3GPP TSG RAN WG2 #69, R2-101146 "Measurement Events Generalization for Carrier Aggregation" Media Tek Inc., San Francisco, USA, Feb. 22-26, 2010, 4 pages.

Patent Cooperation Treaty, "Search Report and Written Opinion" for International Application No. PCT/US2012/024652 Jun. 26, 2012, 23 pages.

3GPP TSG RAN WG4 Ad Hoc #10-03, R4-102730 "Baseline Simulations Assumptions for Measurements of Deactivated Carriers" Nokia et al.; Bratislava, Slovakia; Jun. 28-Jul. 2, 2010, 12 pages.

3GPP TSG RAN WG4 #57AH, R4-110331 "Configurability of Measurement Period for Deactivated SCells" Renesas Electronics Europe, Nokia; Austin, United States; Jan. 17-21, 2011, 3 pages.

3GPP TSG RAN WG4 #58, R4-110936 "Additional RRM Requirements for Carrier Aggregation" Renesas Electronics Europe, Nokia; Taipei, Taiwan; Feb. 21-25, 2011, 8 pages.

3GPP TSG RAN WG4 #58, R4-110963 "Simulation Results for Measurements of Deactivated SCells with Configurable Measurement Cycle in CA Scenario 4" Nokian Corporation, Nokia Siemens Networks; Taipei, Taiwan; Feb. 21-25, 2011, 12 pages.

3GPP TSG RAN WG2 #73, Tdoc R2-111090 "Measurement Behavior for SCell" MediaTek; Taipei, Taiwan; Feb. 21-25, 2011, 4 pages.

3GPP TSG RAN WG4 Meeting 3GPPRAN4 AH#04, R4-103667, "Discussion about LTE-A UE Capability" Mediatek Inc., Xi'an, China, Oct. 11-15, 2010; 3 pages.

3GPP TSG-RAN WG4 AH#4, R4-103776, "Carrier Imbalance and Carrier Activation/Deactivation" Qualcomm Incorporated, Xian, China, Oct. 11-15, 2010; 2 pages.

3GPP TSG-RAN WG4 Meeting #57, R4-104310, "Way forward for RF retuning and carrier aggregation image rejection" Nokia, Mediatek, Jacksonville, United States of America, Nov. 15-19, 2010; 7 pages.

TSG-RAN Working Group 4 (Radio) Meeting #57, R4-104825, "TP for TR 36.808: Channel spacing for intra-band contiguous CA" Nokia Siemens Networks et al., Jacksonville, FL, US, Nov. 15-19, 2010; 4 pages.

Tubbax et al., "Compensation of IQ imbalance in OFDM systems" 2003 IEEE, 5 pages.

Tubbax et al., "Compensation of IQ Imbalance and Phase Noise in OFDM Systems" IEEE Transaction on Wireless Communications, vol. 4, No. 3, May 2005; 6 pages.

Zou et al., "Joint Compensation of IQ Imbalance and Phase Noise in OFDM Systems" Proceedings of the 40th Asilomar Conference on Signals, Systems and Computers, Pacific Grove, CA, Oct. 2006; 5 pages.

Kirshnamurthy et al., "IQ Imbalance Image Compensation in Multi-Carrier Wireless Communication Systems" U.S. Appl. No. 13/031,391, filed Feb. 21, 2011, 38 pages.

United States Patent and Trademark Office, Non-Final Office Action for U.S. Appl. No. 13/031,391 dated Jan. 4, 2013, 22 pages.

United States Patent and Trademark Office, Non-Final Office Action for U.S. Appl. No. 13/031,401 dated May 10, 2013, 15 pages.

* cited by examiner

IQ IMBALANCE IMAGE COMPENSATION IN MULTI-CARRIER WIRELESS COMMUNICATION SYSTEMS

FIELD OF THE DISCLOSURE

The present disclosure relates generally to wireless communications and, more particularly, to IQ imbalance image compensation in multi-carrier wireless communication systems.

BACKGROUND

In carrier aggregation (CA), a secondary serving cell (Scell) can be much stronger than a primary serving cell (Pcell), for example, based on reference signal received power (RSRP) measurements, due to radio resource management (RRM) inefficiencies. This is especially likely in CA scenarios with staggered beam patterns and non-overlapping coverage areas where approximately 5-10% of the UEs may have a Scell that is stronger than a Pcell by 10 dB (in RSRP) or more per R4-103677. Due to IQ imbalance, this power imbalance can result in a Scell image interfering with the Pcell signal when a wideband transceiver is used to receive the Pcell and the Scell simultaneously, e.g., two 10 MHz adjacent carriers being aggregated (intra-band CA). With an IQ gain imbalance of 1.1 (approximately 26 dB adjacent channel interference rejection ratio), a 10 dB RSRP delta between the Pcell and the Scell can lead to the Pcell signal to noise (SNR) being limited to around 15 dB thereby limiting the schedulable modulation coding scheme (MCS) on the Pcell, e.g., a modulation coding scheme (MCS) 64 QAM rate=⅚ cannot be scheduled without performance degradation, as described in R4-104310.

In LTE Rel-10, up to 5 component carriers (CCs) can be aggregated (e.g., 5×20 MHz in a 100 MHz band) in the intra-band CA case. Although the gain/phase imbalance at the local oscillator (LO)/mixer is independent of the low-noise amplifier (LNA) filter bandwidth or the analog-to-digital (ADC) bandwidth (BW) and the sampling rate, the amount of leakage of one CC into another depends on (i) whether or not the receiver uses a single Fast Fourier Transform (FFT) or multiple FFTs, and (ii) whether or not there are filters that follow the ADC to separate out the individual CCs in the multiple FFT case.

For the simplest case of two CCs (i.e., a Pcell and one Scell), a multiple FFT receiver architecture is shown in FIG. 1 where Component Carrier #1 (CC1) is received on a lower carrier frequency relative to Component Carrier #2 (CC2). A single FFT architecture is shown in FIG. 2.

For a receiver architecture the image from a transmission received on one CC interfering with another CC must be calibrated in CC-pairs (e.g., for 5 CCs in intra-band CA, there are $$\binom{5}{2} = 5!/(2!3!) = 10 \text{ pairs}).$$

This entails significant effort for the User Equipment (UE) manufacturer. Further, the filter characteristics might change as a function of the number of activated/configured CCs and the bandwidth (BW) of each CC, possibly rendering pre-calibration infeasible.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 3:
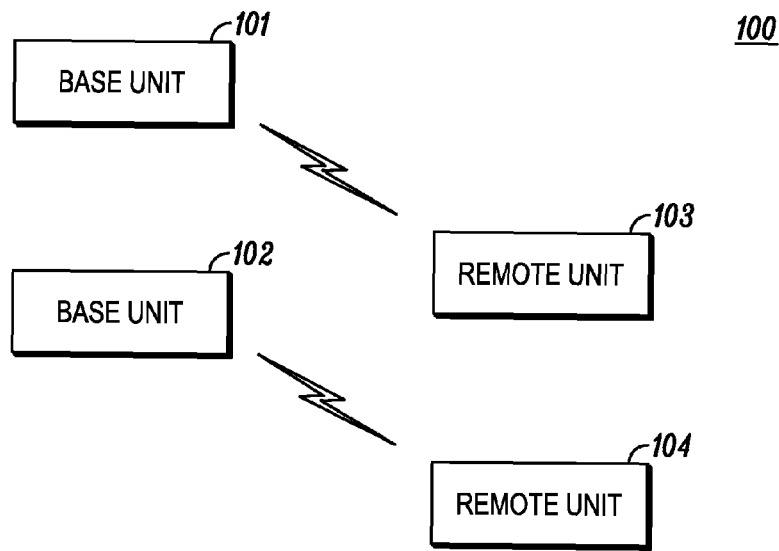
FIG. 3 is an exemplary wireless communication system employing carrier aggregation.

In FIG. 3, a wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, NodeB, enhanced NodeB (eNodeB), Home NodeB (HNB), Home eNodeB (HeNB), Macro eNodeB (MeNB), Donor eNodeB (DeNB), relay node (RN), femtocell, femto-node, network node or by other terminology used in the art. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 3, the one or more base units serve a number of remote units 103, 104 within a corresponding serving area, for example, a cell or a cell sector, via a wireless communication link. The remote units may be fixed or mobile. The remote units may also be referred to as subscriber units, mobiles, mobile stations, mobile units, users, terminals, subscriber stations, user equipment (UE), user terminals, wireless communication devices, relay node, or by other terminology used in the art. The remote units also comprise one or more transmitters and one or more receivers. In FIG. 3, the base unit 101 transmits downlink communication signals to serve remote unit 103 in the time and/or frequency and/or spatial domain. The remote unit 104 communicates with base unit 102 via uplink communication signals. Sometimes the base unit is referred to as a serving or connected or anchor cell for the remote unit. The remote units may also communicate with the base unit via a relay node.

In one implementation, the wireless communication system is compliant with the 3GPP Universal Mobile Telecommunications System (UMTS) LTE protocol, also referred to as EUTRA or 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 8 (Rel-8) and LTE Release 10 (Rel-10) and possibly later evolutions, but may also be applicable to other wireless communication systems. More generally the wireless communication system may implement some other open or proprietary communication protocol, for example, IEEE 802.16(d) (WiMAX), IEEE 802.16(e) (mobile WiMAX), among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a Time Division Duplex (TDD) or Frequency Division Duplex (FDD) system.

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator (RI), or the number of data streams sent on the same resources; precoding matrix index (PMI); and coding parameters, such as a modulation and coding scheme (MCS) or a channel quality indicator (CQI). Together MCS or CQI, PMI and RI constitute elements of the Channel State Information (CSI) which convey the quality of MIMO channel indicative of the reliability and condition number of the channel capable of supporting multi-stream communication between the eNB and the UE. For example, if a UE determines that the link can support a rank greater than one, it may report multiple CQI values (e.g., two CQI values when rank=2 by signaling of the corresponding RI). Further, the link quality measurements may be reported on a periodic or aperiodic basis, as instructed by an eNB, in one of the supported feedback modes. The reports may include wideband or subband frequency selective information of the parameters. The eNB may use the rank information, the CQI, and other parameters, such as uplink quality information, to serve the UE on the uplink and downlink channels. Spatial multiplexing transmission can either be CRS-based (i.e., UE utilizes CRS for both CQI/PMI/RI estimation and for demodulation) or DRS-based (i.e., UE uses either CRS or CSI-RS for CQI/PMI/RI estimation and uses DRS for demodulation).

In an E-UTRA system, an uplink data channel may be a Physical Uplink Shared Channel (PUSCH), an uplink control channel may be a physical uplink control channel (PUCCH), a downlink control channel may be a physical downlink control channel (PDCCH), and downlink data channel may be a physical downlink shared channel (PDSCH). Uplink control information may be communicated over the PUCCH and/or the PUSCH and downlink control information is communicated typically over the PDCCH. The UE may further transmit uplink sounding reference signals to assist the eNB on scheduling uplink (for frequency division duplex (FDD)) and for one or both uplink and downlink for time-division duplex (TDD). In the Rel-8 LTE and beyond LTE systems such as Rel-10 (also known as LTE-Advanced), the base station transmits using an OFDM modulation scheme on the downlink and the UEs transmit on the uplink using a single carrier frequency division multiple access (SC-FDMA) scheme and/or Discrete Fourier Transform Spread OFDM (DFT-SOFDM). On the UL, the UE may transmit using contiguous or non-contiguous resource allocations and the UE may also transmit data and control on the uplink simultaneously using the so-called simultaneous PUCCH and PUSCH transmission scheme. In a Frequency Division Duplex (FDD) operation, the frame structure in the uplink and downlink, each comprises of a 10 millisecond (ms) Radio frame, which is in turn divided into ten subframes each of 1 ms duration wherein each subframe is divided into two slots of 0.5 ms each, wherein each slot contains a number of OFDM symbols. The downlink and uplink bandwidth are subdivided into resource blocks, wherein each resource block comprises of one or more subcarriers in frequency and one or more OFDM symbols in the time domain (12 subcarriers×7 OFDM symbols for normal Cyclic Prefix (CP)). In LTE resource blocks are defined on a slot basis. A resource block (RB) is typical unit in which the resource allocations are assigned for the uplink and downlink communications. Furthermore, the eNB configures appropriate channels for uplink and downlink control information exchange. For the DL the physical downlink control channel (PDCCH) is used for sending the uplink and downlink control information to the UEs. The PDCCH is sent in the beginning portion of a subframe on a potentially variable number of OFDM symbols, and this number (typically 0 to 3 for large system bandwidths such as 5 MHz, etc and 0 to 4 for smaller system bandwidths such as 1.25 MHz) is signaled on the Physical Control Format Indicator Channel (PCFICH) or sent via higher layer signaling. However, in other scenarios, the PDCCH may also be located in certain fixed or variable time/frequency/spatial resources i.e., spanning one or more subcarriers in one or more subframes and/or one or more spatial layers. For example, it may occupy a subset of resource blocks instead of spanning the entire DL system bandwidth. The Physical Hybrid ARQ Channel (PHICH) is the Acknowledgment indicator channel used to send the HARQ feedback on the DL for the uplink data transmissions from the UE. The PCFICH, PHICH, PDCCH are sent on OFDM symbols at the beginning of the DL subframes. In some subframes such as ABS or when the eNB has no UEs scheduled (i.e. very low or no load cases), these channels may be absent. In LTE Release-8, the master information block (MIB) is sent on the Physical Broadcast CHannel (PBCH), the MIB comprises of system frame number (SFN), downlink system bandwidth, number of signaled downlink transmit antennas (or the number of CRS ports), and Physical Hybrid ARQ Channel (PHICH) configuration (i.e. duration). In LTE Release-8, the PBCH is sent on subframe 0 (each subframe comprising of two slots, each slot corresponding to a 0.5 milli-second). The Synchronization signals are transmitted on the inner six PRBs or inner 72 subcarriers (i.e. 1.25 MHz) on subframes 0 and 5. The exact location of the Synchronization signals depends upon the duplex type, Cyclic Prefix length, etc.

If an MBSFN subframe is configured, the subframe may contain an initial portion (near the beginning of the subframe) containing a unicast region and the rest of the subframe may be configured differently based on the higher layer signaling.

If the MBSFN subframe is used for transmission of multicast transmission channel (MTCH), then the rest of the subframe may contain multicast OFDM symbols with cyclic prefix (CP) that may be distinct (and likely larger) than the CP used for the initial transmission. In Rel-8/9, the MBSFN subframe configuration is typically sent in the System Information Block (SIB) SIB2 message, wherein the SIB2 message is a higher layer message sent on the PDSCH by the eNB. The schedule of SIB2, SIB3, (and other SIB messages) is indicated in SIM. The System information typically changes on the order of SIB transmission window (e.g. in multiples of 8 ms) i.e. the system information update only when a new SI-transmission window begins and the UEs are paged to indicate a SI update so that they can re-acquire system information. Typically SIB transmissions are not allowed in MBSFN subframes as there may be no CRS in the data region of the MBSFN subframes.

In aggregated carrier systems, a User Equipment (UE) can receive and transmit control and data signaling on multiple component carriers (CCs). Initially, the UE may communicate with the network by receiving only a single CC (Primary or Anchor CC). In some implementations, the network sends a configuration message (SI configuration message) to the UE on the primary CC with system information (SI) corresponding to other CCs on which the network may schedule the UE. The SI typically includes CC specific information that the UE is required to store in order to communicate with the network on other CCs. The SI can include CC specific information such as CC carrier frequency, downlink (DL) bandwidth, number of antennas, downlink reference signal power, uplink (UL) power control parameters and other information that does not change frequently. In some AC systems, base station sends the SI configuration message to the UE using Radio Resource Configuration (RRC) signaling, since the SI does not change frequently and the payload associated with the SI configuration is relatively large. Upon receipt of the SI configuration, the UE stores the SI for other CCs but continues to communicate with the network by only receiving the primary CC. The other CCs for which the UE has received SI and the primary CC constitute the UE's "configured CC set".

Figure 4:
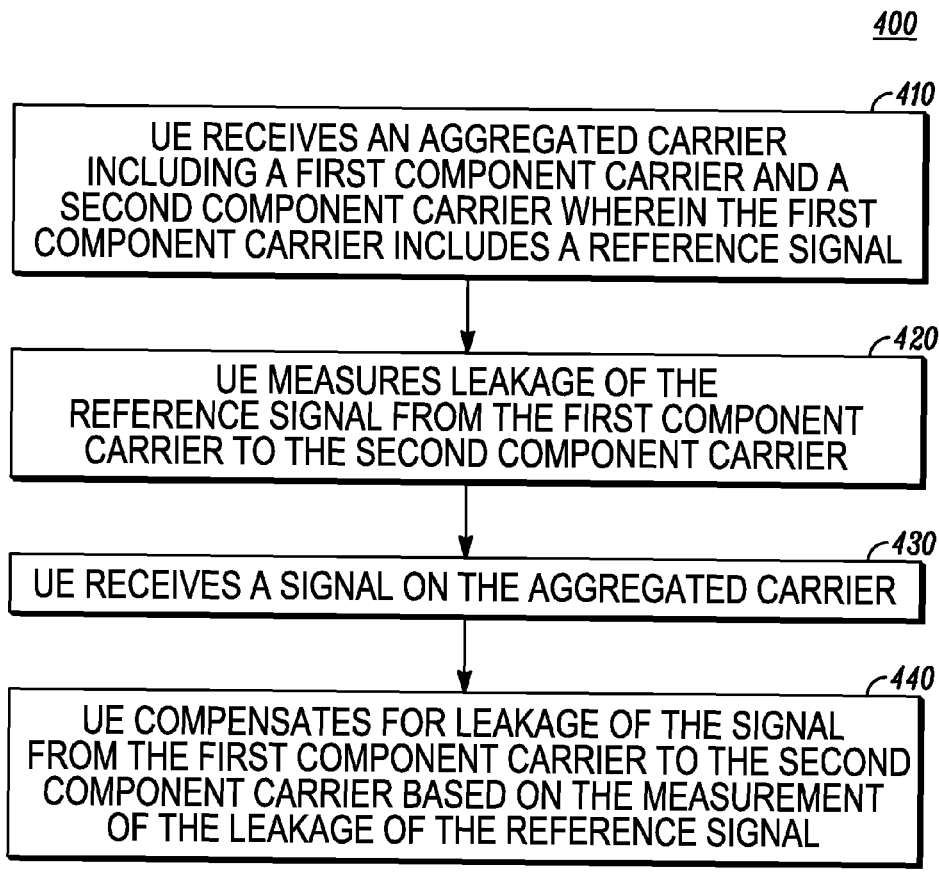
FIG. 4 illustrates a process flow diagram.

According to one aspect of the disclosure, illustrated in process flow diagram 400 in FIG. 4, in a wireless communication terminal receives an aggregated carrier including a first component carrier and a second component carrier, as indicated at 410, from one or more base stations in the wireless communication system. The first component carrier generally comprises a reference signal (RS). In one embodiment, the reference signal is embodied as a cell-specific reference signal (CRS), a positioning reference signal (PRS), UE reference signal (UE-RS), Channel State Information Reference Signal (CSI-RS), a Demodulation reference signal (DRS or DM-RS), a pilot signal, a beacon signal among other reference symbols or signals that may be used as a basis for determining a leakage from the first component carrier to the second component carrier as described more fully below.

In FIG. 4, at 420, the UE measures leakage of the reference signal from the first component carrier onto the second component carrier. In one implementation, the reference signal is transmitted on a particular time slot, for example on the first component carrier in the example described above. According to this example, the reference signal leakage from the first component carrier is measured on a corresponding time slot on the second component carrier. Generally the time slots on the first and second component carriers are coincident in the time domain, although in some circumstances they may be only partially aligned or overlapping in the time domain.

Figure 5:
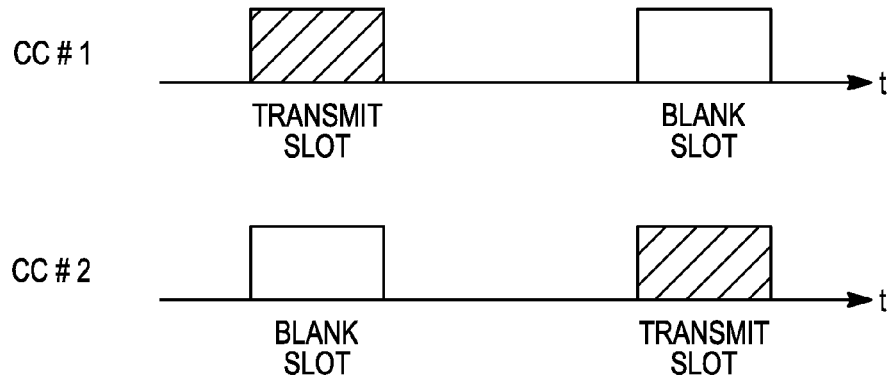
FIG. 5 illustrates an exemplary coordination scheme for two component carriers.
Figure 6:
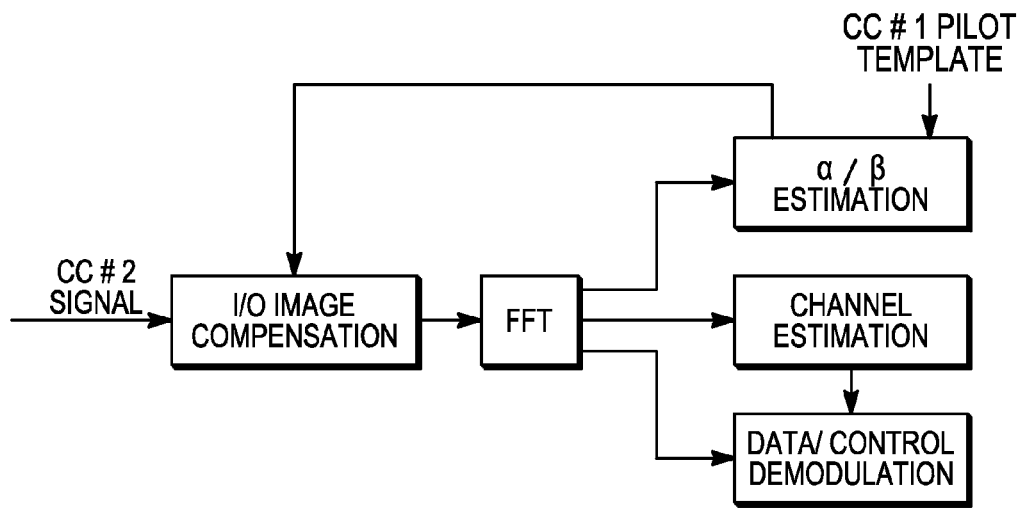
FIG. 6 is a schematic illustrating I/Q imbalance image compensation.

In one embodiment, pilots transmitted on one CC can be used to estimate the component of the image on a second CC. This can be accomplished by coordinating transmission on the two CCs where transmit/blank time slots or zones are created. FIG. 5 illustrates an exemplary coordination scheme for two CCs, where the eNB blanks transmission on CC2 when CC1 transmits only pilots on one time slot and the eNB blanks CC1 when CC2 transmits only pilots in a second time slot. In LTE, a blank slot can be created by configuring a MBSFN subframe and not scheduling PDSCH in that subframe (and as a result CRS is also absent in such a subframe) such that the blank slot is equivalent to the entire non-control region. A transmit slot can be created by configuring a normal subframe that does not carry any PDSCH (but, by definition carries at least the CRS). CRS from only one antenna port may be transmitted to assist image compensation. Image compensation can be summarily described as follows. Receiving a RS transmission on the first CC results in a leakage component on the second CC due to receiver non-linearity. The leakage component is a function of both the received RS (with known signal structure) and some variables that parameterize the receiver non-linearity (in this case, IQ gain and phase imbalance which is also known as the quadrature non-linearity). The received signal on the second CC and the known RS sequence are made use of to estimate the variables that parameterize the receiver non-linearity. A detailed embodiment of this procedure is described under "Training Period" and "Parameter Estimation" below. Once the parameters associated with the receiver non-linearity are determined, a compensation circuit can make use of these parameters to pre-compensate the signal received on the second CC before the signal is processed to extract data embedded in the signal. In one embodiment, the compensation circuit can estimate the leakage signal component that is corrupting the portion of the signal corresponding to the second CC on a real-time basis and subtract it off prior to FFT processing as shown in FIG. 6. Instead of using CRS (with or without transmit/blank coordination), the positioning reference signal (PRS) can be configured to assist UE in IQ imbalance compensation. Six PRS patterns are available (v_shift=mod(PCID, 6)) together with time-domain PRS muting which leads to a large time-frequency reuse factor.

In one implementation, the leakage of the reference signal from the first component carrier onto the second component carrier is measured only intermittently, for example, during a time interval that may be considered a training period. The measurement or estimation of the leakage may also be made periodically, for example, every few milliseconds or every second or so. In another embodiment, the UE receives scheduling information from the base station indicating when the reference signal will be transmitted on the first component carrier. In one particular implementation, the scheduling information is indicative of a time offset and in some embodiments a periodicity for the reference signal. For example, the time offset may be indicative of when the reference signal will be received relative to some reference, e.g., the beginning of a frame or subframe, and the periodicity may indicate how frequently the reference signal is transmitted. The UE need not measure leakage on every transmission of the reference signal. For example, the frequency with which the leakage is measured may be predicated on some criteria, for example, a metric indicative of motion or velocity of the UE or some other metric indicative of a need for updating the leakage measurement.

In FIG. 4, at 430, the UE receives a signal on the aggregated carrier, for example, on the first and second component carriers described above. At 440, the UE compensates for leakage of the signal from the first component carrier to the second component carrier based on the measurement of the leakage of the reference signal.

Figure 1:
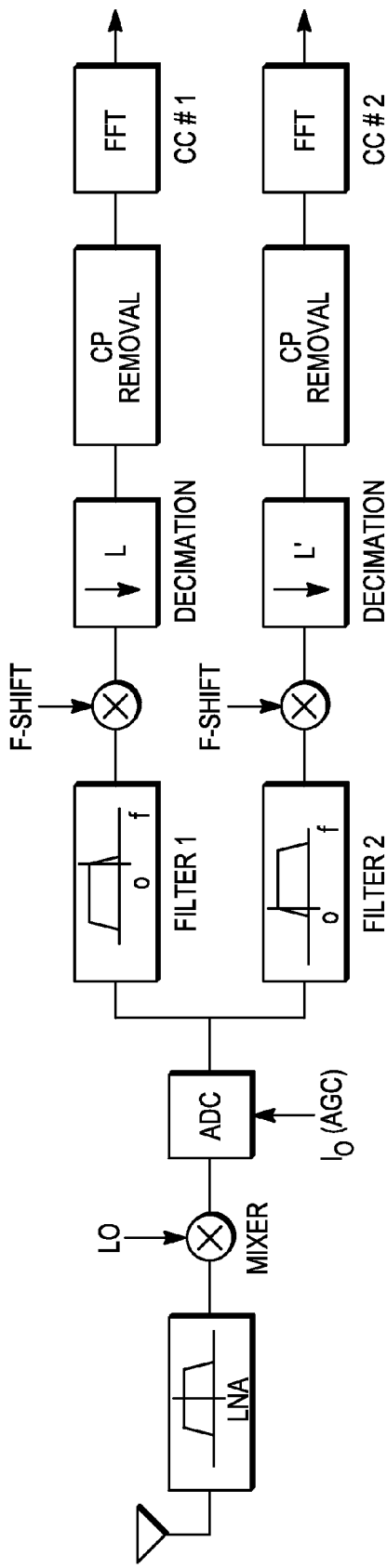
FIG. 1 is a prior art receiver architecture having multiple Fast Fourier Transforms (FFTs).
Figure 2:
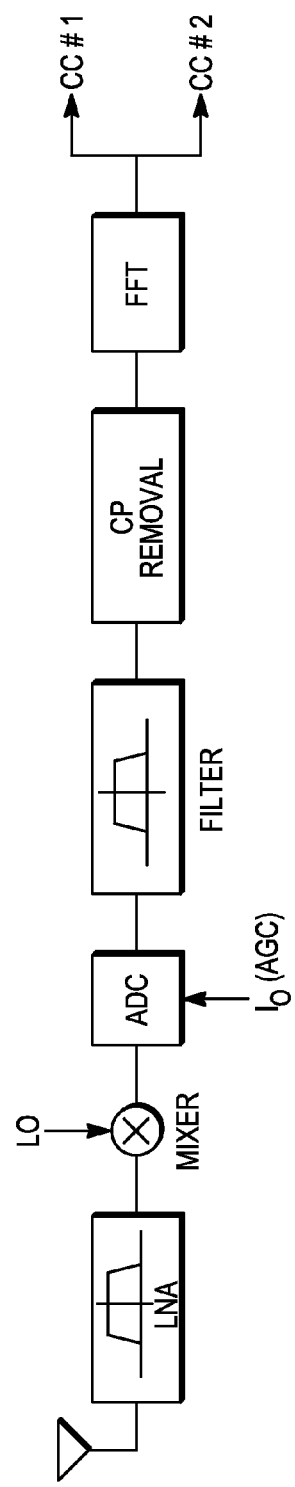
FIG. 2 is a prior art receiver architecture having a single FFT.

In one implementation, generally, the UE generates or estimates one or more parameters based on the measurement of the leakage of the reference signal. In the example, above this leakage occurs from the first component carrier to the second component carrier. The UE compensates for the leakage by applying a transformation of the parameter to the received signal. The transformation may be in the time domain or in the frequency domain. In one embodiment, the transformation of the parameter to the received signal is a linear combination of the received signal scaled by a first coefficient and a complex conjugate of the received signal scaled by a second coefficient, and wherein the first and second coefficients of the linear combination are a function of the estimated parameter. FIG. 6 illustrates an implementation where the parameters associated with the image of CC1 are estimated (post-FFT and based on a signal template of pilot transmission in CC1) and are used for compensating for the CC1's image in time-domain (prior to FFT) in CC2's receive chain. This is applicable to both single-FFT and multiple-FFT architectures illustrated in FIGS. 1 and 2.

Figure 7:
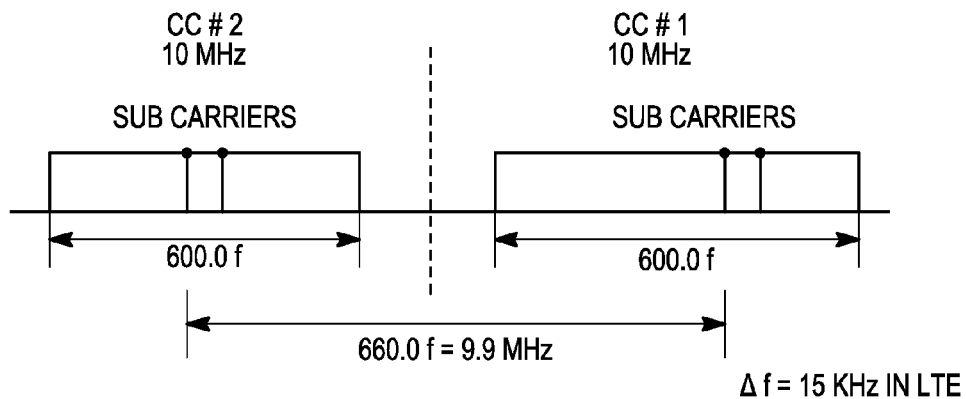
FIG. 7 illustrates intra-band contiguous aggregated carrier.

In some LTE releases, the carrier separation for intra-band CA is multiple of 300 kHz (i.e., the least common multiple of raster spacing 100 kHz and subcarrier spacing 15 kHz). This allows the use of a single FFT receiver for demodulating multiple aggregated CCs within the same band. The simplest case of 10 MHz+10 MHz intra-band contiguous CA is shown in FIG. 7.

A method of estimating the parameters associated with a Scell image arising out of IQ imbalance is described below. Consider the case of 2 CCs of equal BW on adjacent carriers with a separation of $2K\Delta f$, where $\Delta f$ is the subcarrier spacing and K is an integer compliant with the carrier spacing requirements in R4-104825. Assuming that the carrier center is at about the mid-point of the transmission BW, the received pre-FFT signal can be written as $$x(t)=e^{j(K+1)\Delta f \cdot t}x_1(t)+e^{-jK\Delta f \cdot t}x_2(t),$$

where $x_1(t)$ and $x_2(t)$ represent the time-domain signals for CC#1 and CC#2 respectively.

Due to IQ imbalance, the received signal can be written as $$y(t)=\alpha x(t)+\beta \bar{x}(t),$$

where $\alpha=\cos\phi+j\epsilon\sin\phi$ and $\beta=\epsilon\cos\phi-j\sin\phi$, and $\phi$ is the LO phase imbalance and $\epsilon$ is deviation of the gain from unity representing the LO gain imbalance. Therefore, y(t) can be written as $$y(t)=e^{j(K+1)\Delta f \cdot t}(\alpha x_1(t)+\beta e^{-j\Delta f \cdot t}\bar{x}_2(t))+e^{-jK\Delta f \cdot t}(\alpha x_2(t)+\beta e^{-j\Delta f \cdot t}\bar{x}_1(t)).$$

Post-FFT, the frequency domain signal for the two CCs have the following equivalent representation.

$$CC\#1: Y_1(k)=\alpha X_1(k)+\beta \bar{X}_2(N-k-1)$$

$$CC\#2: Y_2(k)=\alpha X_2(k)+\beta \bar{X}_1(N-k-1)$$

where $k=0, 1, \ldots, N-1$ and N is the number of subcarriers in each CC. Clearly, the second CC leaks into the first and vice-versa. The image is proportional to the complex-conjugate of the signal reversed in sequence in the frequency-domain and shifted by one subcarrier. If uncompensated, this image term can limit the achievable SNR in each CC.

In a time slot where only CRS is being transmitted on both CCs, there may or may not be CRS interference from one CC (image) to CRS reception on a second CC depending on relative frequency shifts for CRS and the number of transmit antenna ports. For example, for 2 Tx, there is no CRS collision if $mod(PCID_1,3)$ is equal to $mod(PCID_2,3)$ where $PCID_1$ and $PCID_2$ are the PCIDs associated with the two CCs. In this case, there is no need to blank transmission on one CC when the other CC is transmitting CRS as shown in FIG. 5. Instead, both CRS can be transmitted on both CCs in CRS-only sub-frames (e.g., almost blank subframe configured on a normal subframe where PDSCH is not transmitted). Muting transmission on all CRS ports except for one (e.g., port #0) can further reduce the likelihood of CRS collision.

In a single-FFT receiver, if $N_{FFT}$ is the basic FFT size associated with each CC, a FFT of size $2N_{FFT}$ can be used for extracting signals for the two CCs in the present embodiment. In a dual-FFT receiver, the signal after the ADC stage is bandpass filtered prior to FFT to extract a signal corresponding to the two CCs in an alternate embodiment. A unified approach can be developed for estimating $\alpha$ and $\beta$ for both the single and dual FFT receivers (i.e., both embodiments) as the response of bandpass filter in the multiple FFT case is known for each implementation.

Estimating the parameters $\alpha$ and $\beta$ based on CRS transmission in one or both CCs can constitute the first step in IQ imbalance compensation. After estimating these parameters, a correction can be carried out in time domain (pre-FFT) for both single-FFT and dual-FFT implementations as shown in FIG. 6 by making use of the equation:

$$z_{corr}(t)=\frac{\bar{\alpha}z(t)-\beta\bar{z}(t)}{|\alpha|^2-|\beta|^2},$$

where z(t) is the time-domain signal for a single CC (dual-FFT receiver) or all CCs (single-FFT receiver).

When there is no CRS collision (either due to the selection of suitable PCID pairs for the two CCs or due to transmit/blank coordination of FIG. 3), the received signal can be divided into four groups of subcarriers over which CRS is received:

$$H^{(1,1)}(l):=Y_1(k)\bar{s}_1(k), k\in S_{1,1}$$

$$H^{(1,2)}(l):=Y_1(N-k-1)\bar{s}_1(N-k-1), k\in S_{1,2}$$

$$H^{(2,1)}(l):=Y_2(k)\bar{s}_2(k), k\in S_{2,1}$$

$$H^{(2,2)}(l):=Y_2(N-k-1)\bar{s}_2(N-k-1), k\in S_{2,2}$$

where $S_{i,j}$ is the set of subcarriers over which CRS transmission on CC#j is received on CC#i, and $s_j(k)$ is the CRS sequence for CC#j in frequency domain. The index l belongs to the range $l=0, 1, \ldots, L-1$, where $L=100$ for the 10 MHz case. The index l maps to index k in set $S_Z$ in a one-to-one fashion.

If $H^{(j)}(l)$ is the actual channel response on CC#j (i.e., noise-less channel response or ideal channel estimate), we have the following sets of equations.

$$H^{(1,1)}(l)=\alpha H^{(1)}(l)+\text{noise}$$

$$\bar{H}^{(1,2)}(L-l-1)=\bar{\beta}\gamma_{L-1}H^{(2)}(l)+\text{noise}$$

$$H^{(2,1)}(l)=\alpha H^{(2)}(l)+\text{noise}$$

$$\bar{H}^{(2,2)}(L-l-1)=\bar{\beta}\delta_{L-1}H^{(1)}(l)+\text{noise}$$

where $\gamma_l$'s are the (known) filter response coefficients for receiving a signal on CC#2 in the BW of CC#1 and $\delta_l$ is the corresponding filter response for receiving signal on CC#1 in the BW of CC#2. For the single-FFT case, $\gamma_l=\delta_l=1$ as there is no bandpass filtering. For the multiple FFT case, these coefficients are known implementation-dependent constants.

The sequence of $H^{(j)}(l)$'s can be written in vector form as $$\begin{bmatrix} H^{(j)}(1) \\ \vdots \\ H^{(j)}(L) \end{bmatrix} = W_{L\times P}^{(j)} \begin{bmatrix} h(1) \\ \vdots \\ h(P) \end{bmatrix}$$

where $h(n)$ are the time-domain channel response coefficients and $W_{L\times P}^{(j)}$ is the subsampled matrix of a $2N_{FFT} \times 2N_{FFT}$ DFT matrix applicable to the reception of CRS subcarriers in CC#j, and P is the length of the channel response at sample rate $2N_{FFT}$.

In matrix form, the equations above can be written as $$\underbrace{\begin{bmatrix} H^{(1,1)}(0) \\ \vdots \\ H^{(1,1)}(L-1) \\ \overline{H}^{(2,2)}(L-1) \\ \vdots \\ \overline{H}^{(2,2)}(0) \end{bmatrix}}_{z_1} = \underbrace{\begin{bmatrix} \alpha I_L & 0 \\ 0 & \overline{\beta} I_L \end{bmatrix} \begin{bmatrix} G \\ D \end{bmatrix} W_{L\times P}^{(1)}}_{F(\alpha,\beta)} \underbrace{\begin{bmatrix} h(0) \\ \vdots \\ h(P-1) \end{bmatrix}}_{h} + \text{noise}$$

$$\underbrace{\begin{bmatrix} H^{(1,2)}(0) \\ \vdots \\ H^{(1,2)}(L-1) \\ \overline{H}^{(2,1)}(L-1) \\ \vdots \\ \overline{H}^{(2,1)}(0) \end{bmatrix}}_{z_2} = \underbrace{\begin{bmatrix} \alpha I_L & 0 \\ 0 & \overline{\beta} I_L \end{bmatrix} \begin{bmatrix} G \\ D \end{bmatrix} W_{L\times P}^{(2)}}_{F(\alpha,\beta)} \underbrace{\begin{bmatrix} h(0) \\ \vdots \\ h(P-1) \end{bmatrix}}_{h} + \text{noise}$$

where $G=\text{diag}(\{\gamma_l\})$ and $D=\text{diag}(\{\delta_l\})$.

The parameters $(\alpha, \beta)$ and the channel response h can be jointly estimated by the minimization problem:

$$\min_{(\alpha,\beta,h)} \left\| \begin{bmatrix} z_1 \\ z_2 \end{bmatrix} - (I_2 \otimes F(\alpha, \beta)) \begin{bmatrix} G & 0 \\ D & 0 \\ 0 & G \\ 0 & D \end{bmatrix} \begin{bmatrix} W_{L\times P}^{(1)} \\ W_{L\times P}^{(2)} \end{bmatrix} h \right\|^2.$$

FIG. 6 illustrates an implementation where parameters associated with the image of CC1 are estimated (post-FFT and based on signal template of pilot transmission in CC1) and are used for compensating for the CC1's image in time-domain (prior to FFT) in CC2's receive chain. This is applicable to both single-FFT and multiple-FFT architectures.

For estimation of the parameters $(\alpha,\beta)$, we show a derivation that uses CRS observations for only one transmit antenna port. For 2/4 Tx, we can augment CRS observations for the other transmit antenna ports in the calculation of the parameters $(\alpha, \beta)$.

The time-domain compensation for IQ imbalance as shown in Appendix A can be applied on a per-receive antenna basis. This method is therefore applicable to multi-layer transmissions.

The UE generally comprises a controller coupled to a wireless transceiver wherein the controller is configured to cause the UE to perform the various functions described herein including receiving the aggregated carrier, measuring leakage of the reference signal, receiving a signal on the aggregated carrier, and compensating for the leaking among the other functionality described herein. The methods and functions described herein may be performed by a digital processor executing software of firmware residing in a memory device. Alternatively the functionality of the UE may be performed by equivalent hardware or by a combination of hardware and software. Similarly, the eNB also comprises a controller coupled to a wireless transceiver wherein the controller is configured to cause the eNB to perform the various functions described herein including transmitting scheduling information indicating when the reference signal will be transmitted, transmitting the reference signal on at least one of the indicated time slots, and blanking a data signal transmission on a second component carrier on a time slot that at least partially overlaps in time with the time slot where the reference signal is transmitted on the first component carrier among other functionality provided herein. Alternatively the functionality of the eNB may be performed by equivalent hardware or by a combination of hardware and software.

Figure 8:
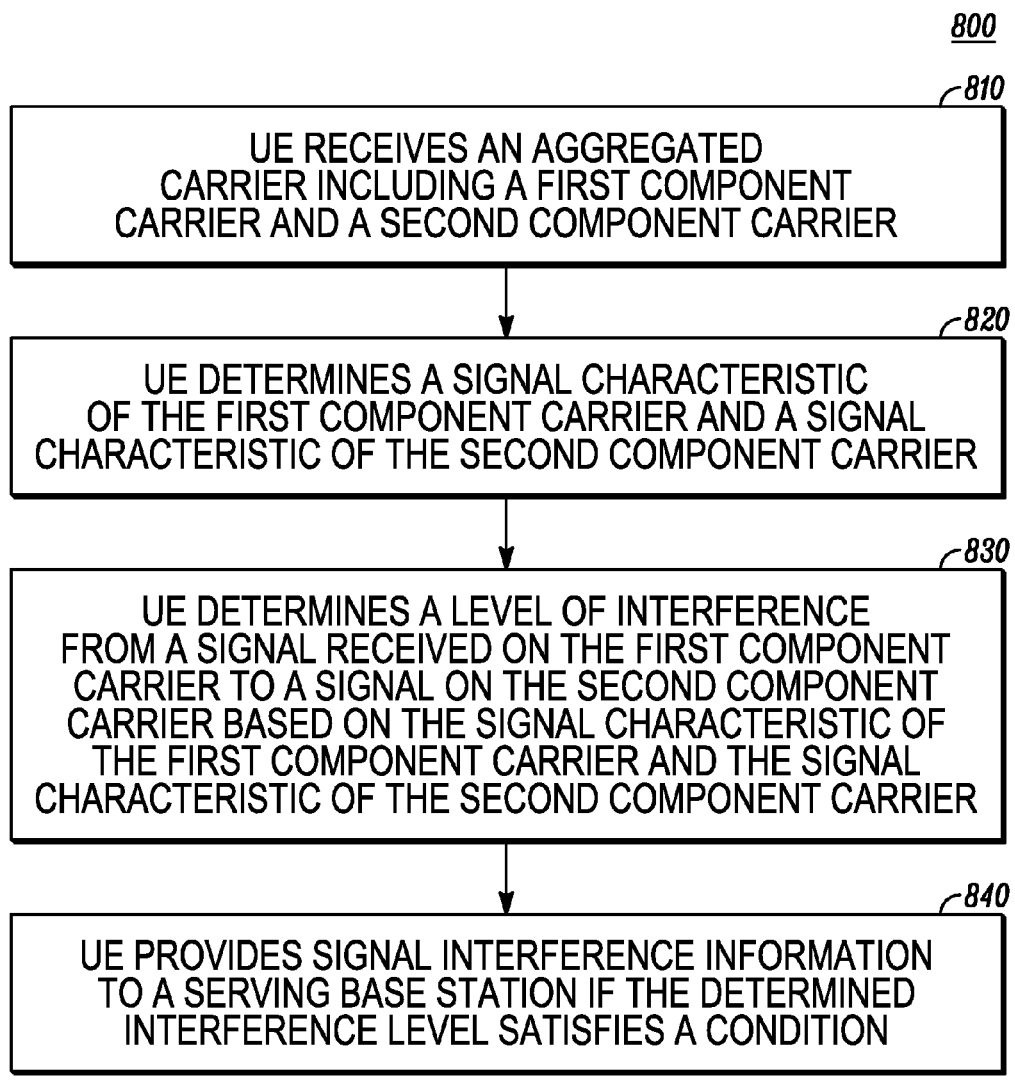
FIG. 8 illustrates another process flow diagram.

According to one aspect of the disclosure, illustrated in process flow diagram 800 in FIG. 8, the wireless communication terminal receives an aggregated carrier including a first component carrier and a second component carrier, as indicated at 810, from one or more base stations in the wireless communication system. At 820, the UE determines a signal characteristic of the first component carrier and a signal characteristic of the second component carrier. The signal characteristic of the component carriers is selected from a group comprising a reference signal received power (RSRP), a reference signal strength indicator (RSSI), a total received power, a channel quality indicator (CQI), and a hypothetical block error rate (BLER) applicable to a packet-coded transmission.

In FIG. 8, at 830, the UE determines a level of interference from a signal received on the first component carrier to a signal on the second component carrier based on the signal characteristic of the first component carrier and the signal characteristic of the second component carrier. In one embodiment, the determines a reference signal received power (RSRP) of the first component carrier and a reference signal received power (RSRP) of the second component carrier. The level of interference may then be determined based on a ratio of the RSRP of the first component carrier with respect to the RSRP of the second component carrier. Alternatively, the level of interference may be determined by comparison of a difference of a logarithm of the RSRP of the first and second carrier components and comparison of the difference to a threshold.

In FIG. 8, at 840, the UE provides signal interference information to a serving base station if the determined interference level satisfies a condition. Satisfaction of the conditions may be determined by comparison of the ratio to a threshold. In one embodiment, the UE indicates the signal interference information to the base station only when both the determined interference level satisfies the condition and upon determining that a modulation coding scheme scheduled on the second component carrier is subject to a specified level of interference from the first component carrier, as described more fully below. In some instances, the UE receives a primary serving cell change command from the serving base station in response to sending the signal interference information to the serving base station.

The UE generally comprises a controller coupled to a wireless transceiver wherein the controller is configured to cause the UE to perform the various functions described herein including receiving the aggregated carrier, measuring leakage of the reference signal, determining signal characteristics on the component carriers, determining the level of interference, and providing signal interference information to the base station among the other functionality described herein. The methods and functions may be performed by a digital processor executing software of firmware residing in a memory device. Alternatively the functionality of the UE may be performed by equivalent hardware or by a combination of hardware and software. Similarly, the eNB also comprises a controller coupled to a wireless transceiver wherein the controller is configured to cause the eNB to perform the various functions described herein including receiving and processing messages from the UE indicating that an impairment from a signal transmitted on a first component carrier to a signal transmitted on the second component carrier exceeds a certain level, configuring a third component carrier as a new primary cell component carrier, and sending a user-specific message to the wireless terminal indicating that the third component carrier has been configured as the new primary cell component carrier, among other functionality provided herein. Alternatively the functionality of the eNB may be performed by equivalent hardware or by a combination of hardware and software.

In a more specific implementation, the second component carrier is configured as a primary serving cell and the first component carrier is configured as a secondary serving cell. In response to receiving a primary serving cell change command from the serving base station, the UE configures a third component carrier as a new primary serving cell. In one use case, the first component carrier is configured as the primary serving cell and the second component carrier is configured as the secondary serving cell. According to this configuration, the third component carrier corresponds to the first component carrier.

In another scenario, the UE receives a DCI grant indicating transmission of a sequence of information symbols according to a modulation order, a coding scheme on the second component carrier and a transmission mode such one of a single-layer transmission, a spatial multiplexing method, a transmit diversity method. In EUTRA Rel-10, if spatial multiplexing transmission scheme is used, the transmission can be based either on CRS or on DRS (and the transmission rank associated with the transmission can be equal to one of 1, 2, 3, 4 for CRS-based transmission and equal to one of 1, 2, . . . , 8 for DRS-based transmission). According to this scenario, the UE also determines a level of interference that the sequence of information symbols is subject to from the first component carrier based on the signal characteristic of the first component carrier and the signal characteristic of the second component carrier. The UE then indicates the signal interference information to the base station only if the level of interference satisfies a condition as described above.

Consider an LTE example where the Scell RSRP exceeds the Pcell RSRP by 11 dB and both the first and second component carriers have full PDSCH loading. Also assume that all resource elements (REs) in a subframe have equal power. If the UE's Scell-to-Pcell adjacent channel interference rejection ratio (ACIRR) which is indicative of the receiver's adjacent channel suppression capability is 26 dB, the SINR on the Pcell is 15 dB. This means that only some MCSs, e.g., MCS 16-28 are degraded if a PDSCH (w.r.t. to BLER) with such an MCS were to be scheduled for the UE. If the UE is not scheduled at all or if a lower MCS such as MCS 1-15 is scheduled, there is no problem. So, the UE sends an indication to the eNB identifying that there is a problem only when the condition is met (i.e., when Scell RSRP minus Pcell RSRP>10 dB), and when the UE receives a DCI grant indicating that a MCS belonging to a certain range (MCS 16-28 in this example) is likely to have degraded performance has been scheduled. The degradation of PDSCH w.r.t. BLER can also be function of the transmission scheme used. For example, the BLER degradation can be more severe for higher rank transmission. Therefore, in an alternate embodiment, the UE can send an indication only when both an MCS within a pre-determined range is scheduled and when the spatial multiplexing transmission rank exceeds a pre-determined value.

In response to receiving such an indication fro the UE, the eNB can schedule a lower MCS or a transmission with lower rank if the effective throughput is increased by lowering the MCS or the transmission rank. It is possible that the packet reception loss associated with the current MCS/rank is small and lowering the MCS can reduce the effective throughput, in which case, the eNB does not lower the MCS or transmission rank.

UE-measured CQI can track SINR degradation due to I/Q imbalance in constant loading or slowly-varying conditions. But, there are some scenarios where this may not be possible particularly when the loading on the Scell is bursty. The leakage due to I/Q gain/phase imbalance is a function of Scell PDSCH loading. Assuming linear dependence (i.e., leakage level on Pcell due to I/Q gain/phase imbalance=constant times Scell loading factor), the leakage level on the Pcell due to I/Q gain/phase imbalance can vary over a $10*\log 10(12 \times 12/(4 \times 4))=9.5$ dB range which could significantly impact the SINR and therefore, the measured CQI. Therefore, there might be a non-trivial probability of UE over-reporting the CQI. The eNB scheduler may take into account the NACK running average (i.e., UE actual decoding error rate) in addition to the reported to CQI in its scheduling decisions. But, as described previously in one of the embodiments, the RSRP difference between the Pcell and Scell can be used to detect a potential leakage problem as RSRP remains invariant to the loading conditions on the Scell. This can then be used to alert the eNB against possible over-scheduling of MCS.

Several UE-based triggers for mitigating the IQ imbalance problem are discussed below. These methods are relevant mainly to single-FFT receivers that are likely to have limited IQ imbalance compensation capability. In one embodiment, the UE can detect that its Pcell is being desensed by the Scell image when the RSRP difference between the Pcell and Scell is large. The UE's image rejection capability, which is a receiver-specific implementation property, can be calibrated. Since the UE monitors Pcell RSRP and Scell RSRP on a continuous basis (both when in DRX and in non-DRX), it can determine whether $RSRP(Scell)-RSRP(Pcell)>threshold\_A.$ In an alternate embodiment, the UE can determine whether $RSSI(Scell)-RSRP(Pcell)>threshold\_B$

OR $RSSI(Scell)-RSSI(Pcell)>threshold\_C.$

The UE can send an indication to the serving eNB (say, over Pcell UL) that Pcell downlink (DL) is likely to get desensed by the Scell image. The quantity threshold_A can be a pre-calibrated threshold determined, for example, based on receiver gain/phase imbalance by the UE manufacturer. The eNB can use this report as a trigger to re-configure the UE's Pcell. For example, the strongest Scell can be configured as a new Pcell for the UE. The UE can also report a Scell index or identifier to indicate which Scell is or may be desensing the Pcell. As a further restriction to reporting, the UE can send such a report only when a MCS with sufficiently high modulation order/code rate combination that is likely to be impacted by the desense problem is being scheduled, otherwise the UE need not send a report.

In one embodiment, the UE sends a request to the eNB asking that a certain Scell be configured as the new Pcell. In an alternative embodiment, the UE can determine (e.g., based on RSSI measurements on the Scell) that the Scell is heavily loaded, in which case the UE can request the eNB to perform an inter-frequency handover to a new Pcell. In another alternative embodiment, the UE can request the eNB that the Scell be activated (if it is currently deactivated) and the UE can be scheduled only on a Scell, wherein scheduling is performed either by PDCCH on the Scell or by means of inter-CC scheduling where PDCCH is sent on the Pcell.

In some embodiments, the UE can also advertise its image rejection capability. For example, the UE can send Adjacent Channel Interference Rejection Ratio (ACIRR) on its uplink (UL) to the eNB. This will enable the eNB to determine if there is an image problem based on RSRP reports that the UE sends on a periodic basis.

According to another aspect of the disclosure, a wireless communication terminal receives a request from a serving base station for wireless communication terminal capability information. In response, the UE sends capability information to the serving base station, wherein the capability information includes an Adjacent Channel Interference Rejection Ratio (ACIRR) for at least one carrier frequency (e.g., EARFCN) pair as part of the RRC capability information exchange. In one embodiment, the UE sends ACIRR together with either a band combination or a carrier aggregation bandwidth class. According to this embodiment, the UE sends separate ACIRR values for each band combination, each carrier aggregation bandwidth class, etc. In a further alternative embodiment, instead of sending the ACIRR value for a EARFCN pair, the UE can send the ACIRR values at different frequencies possibly in relation the different serving cell component carrier frequencies (e.g., If Pcell at carrier frequency F1, ACIRR corresponding to Scell #1 at carrier frequency F2, Scell #2 at carrier frequency F3, etc. are sent by the UE to the eNB).

Although, the specific embodiments presented are applicable to mitigation of receiver impairment due to LO IQ gain/phase imbalance, these techniques can be readily extended to the compensation of other receiver impairments such as phase noise and carrier frequency offset. The effect of receiver impairments on the received signal, in many cases, can be parameterized by a few variables which can be estimated by suitable processing of the received RS sequence. A compensation circuit that makes use of the estimated parameters can be designed to mitigate the effect of the receiver impairment in the received signal.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
receiving, at the terminal, an aggregated carrier including a first component carrier and a second component carrier;
determining a signal characteristic of the first component carrier and a signal characteristic of the second component carrier;
determining a level of interference from a signal received on the first component carrier to a signal on the second component carrier based on the signal characteristic of the first component carrier and the signal characteristic of the second component carrier;
determining whether modulation coding scheme scheduled on the second component carrier is subject to a specified level of interference from the first component carrier based on determining that the modulation coding scheme scheduled on the second component carrier is within a pre-determined range; and
providing signal interference information to a serving base station only when the determined interference level exceeds a predetermined value and when the modulation coding scheme scheduled on the second component carrier is subject to the specified level of interference.

2. The method of claim 1, further comprising:
determining a reference signal received power (RSRP) of the first component carrier and a reference signal received power (RSRP) of the second component carrier;
determining a ratio of the RSRP of the first component carrier with respect to the RSRP of the second component carrier;
determining the level of interference based on the ratio.

3. The method of claim 1, wherein the signal characteristic of the first and second component carriers is selected from a group consisting of: a reference signal received power (RSRP), a reference signal strength indicator, a total received power, a channel quality indicator, and a block error rate applicable to a packet-coded transmission.

4. The method of claim 1, wherein the second component carrier is configured as a primary serving cell and the first component carrier is configured as a secondary serving cell, the method further comprising:
receiving a primary serving cell change command from the serving base station in response to sending the signal interference information to the serving base station; and
configuring a third component carrier as a new primary serving cell in response to receiving the command.

5. The method of claim 1, wherein the first component carrier is configured as a primary serving cell and the second component carrier is configured as a secondary serving cell.

6. A method in a base station configured to transmit an aggregated signal that includes at least two component carriers, the method comprising:
receiving a message from a wireless terminal being served by the base station indicating that an interference from a signal transmitted on a first component carrier to a signal transmitted on the second component carrier exceeds a certain level due to receiver impairment in the wireless terminal, wherein the second component carrier is a secondary cell component carrier and the first component carrier is a primary cell component carrier;
wherein the wireless terminal determining whether modulation coding scheme scheduled on the second component carrier is subject to a specified level of interference from the first component carrier based on determining that the modulation coding scheme scheduled on the second component carrier is within a pre-determined range;
wherein the wireless terminal transmitting the message indicating the interference to the base station only when the interference from the signal transmitted on the first component carrier to the signal transmitted on the second component carrier exceeds said certain level and when the modulation coding scheme scheduled on the second component carrier is subject to the specified level of interference; and configuring a third component carrier as a new primary cell component carrier in response to receiving the message.

7. The method of claim 6, further comprising sending a user-specific message to the wireless terminal indicating that the third component carrier has been configured as the new primary cell component carrier.

8. The method of claim 6, wherein the third component carrier and the second component carrier correspond to the same component carrier, the method further comprising-configuring the second component carrier as the new primary cell component carrier in response to receiving the message.

9. The method of claim 6, wherein the message indicating that the impairment from the signal transmitted on the first component carrier to the signal transmitted on the second component carrier exceeds said certain level includes a signal characteristic of the first component carrier and a signal characteristic of the second component carrier.

10. The method of claim 9, wherein the signal characteristic of the first and second component carriers is selected from a group consisting of: a reference signal received power, a reference signal strength indicator, a total received power, a channel quality indicator, and a block error rate (BLER) applicable to a packet-coded transmission.

11. The method of claim 6, wherein the impairment from the signal transmitted on the first component carrier to the signal transmitted on the second component carrier is due to at least one of a I/Q gain and phase imbalance impairment, a phase noise impairment or a carrier offset impairment.

* * * * *